(12) United States Patent
Shimomura et al.

(10) Patent No.: US 8,427,798 B2
(45) Date of Patent: Apr. 23, 2013

(54) SEMICONDUCTOR INTEGRATED CIRCUIT DEVICE

(75) Inventors: Hiroshi Shimomura, Tokyo (JP); Masaru Numano, Saitama-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 248 days.

(21) Appl. No.: 13/034,012

(22) Filed: Feb. 24, 2011

(65) Prior Publication Data
US 2011/0255201 A1 Oct. 20, 2011

(30) Foreign Application Priority Data
Apr. 16, 2010 (JP) .................................. 2010-094615

(51) Int. Cl.
*H02H 9/00* (2006.01)
(52) U.S. Cl.
USPC .......................................................... 361/56
(58) Field of Classification Search ...................... 361/56
See application file for complete search history.

(56) References Cited

U.S. PATENT DOCUMENTS

| | | | | |
|---|---|---|---|---|
| 5,475,333 A | * | 12/1995 | Kumagai | 327/530 |
| 5,818,281 A | * | 10/1998 | Ohura et al. | 327/381 |
| 6,111,454 A | * | 8/2000 | Shinohe et al. | 327/530 |
| 6,906,573 B2 | | 6/2005 | Numano et al. | |
| 2008/0007883 A1 | * | 1/2008 | Arndt et al. | 361/56 |
| 2010/0244906 A1 | * | 9/2010 | Ishida | 327/108 |

OTHER PUBLICATIONS

Background Art Information Sheet provided by applicants (Jun. 22, 2010) (1 page total).

* cited by examiner

*Primary Examiner* — Jared Fureman
*Assistant Examiner* — Scott Bauer
(74) *Attorney, Agent, or Firm* — Posz Law Group, PLC

(57) ABSTRACT

In one embodiment, a semiconductor integrated circuit includes a power source circuit connected to a terminal of a first high potential side power source and outputs a voltage of a second high potential side power source, and an output transistor outputting an output signal to an output terminal. A cathode of a first diode is connected to the terminal of the first high potential side power source and an anode thereof is connected to the output terminal. A current source and a capacitor are connected between a terminal of the second high potential side power source and the terminal of a low potential side power source. A signal from a connection node of the current source and the capacitor and a control signal are inputted to a logic circuit, and the logic circuit outputs a signal obtained by a logic operation to the control terminal of the output transistor.

19 Claims, 10 Drawing Sheets

SEMICONDUCTOR INTEGRATED CIRCUIT DEVICE

CROSS-REFERENCE TO RELATED APPLICATION

This application is based upon and claims the benefit of priority from Japanese Patent Application No. 2010-94615, filed on Apr. 16, 2010, the entire contents of which are incorporated herein by reference.

FIELD

Embodiments described herein relate generally to a semiconductor integrated circuit device.

BACKGROUND

In semiconductor integrated circuit devices for use in power electronics, power metal oxide semiconductor (MOS) transistors and insulation gate bipolar transistors (IGBT) are often used. For a semiconductor integrated circuit device, an electrostatic discharge (ESD) protection circuit for protecting internal circuits from a surge voltage due to, for example, electrostatic charges or dielectric loads. The ESD protection circuit is formed with diodes, resistors or the like.

The period during which ESD voltage is applied to a terminal is between 1 ns and 10 ns, which is short. Therefore, there is a problem with the ESD protection circuit that, if the ESD protection circuit is positioned separately from an output terminal to which the ESD voltage is applied, the response time is delayed, and the ESD charge is not quickly absorbed. Thereby, degradation and breakdown of the output transistors and internal elements occur if the ESD charge is not quickly absorbed. As a result, there is a problem that desired ESD durability is not obtained.

DETAILED DESCRIPTION

Figure 1:
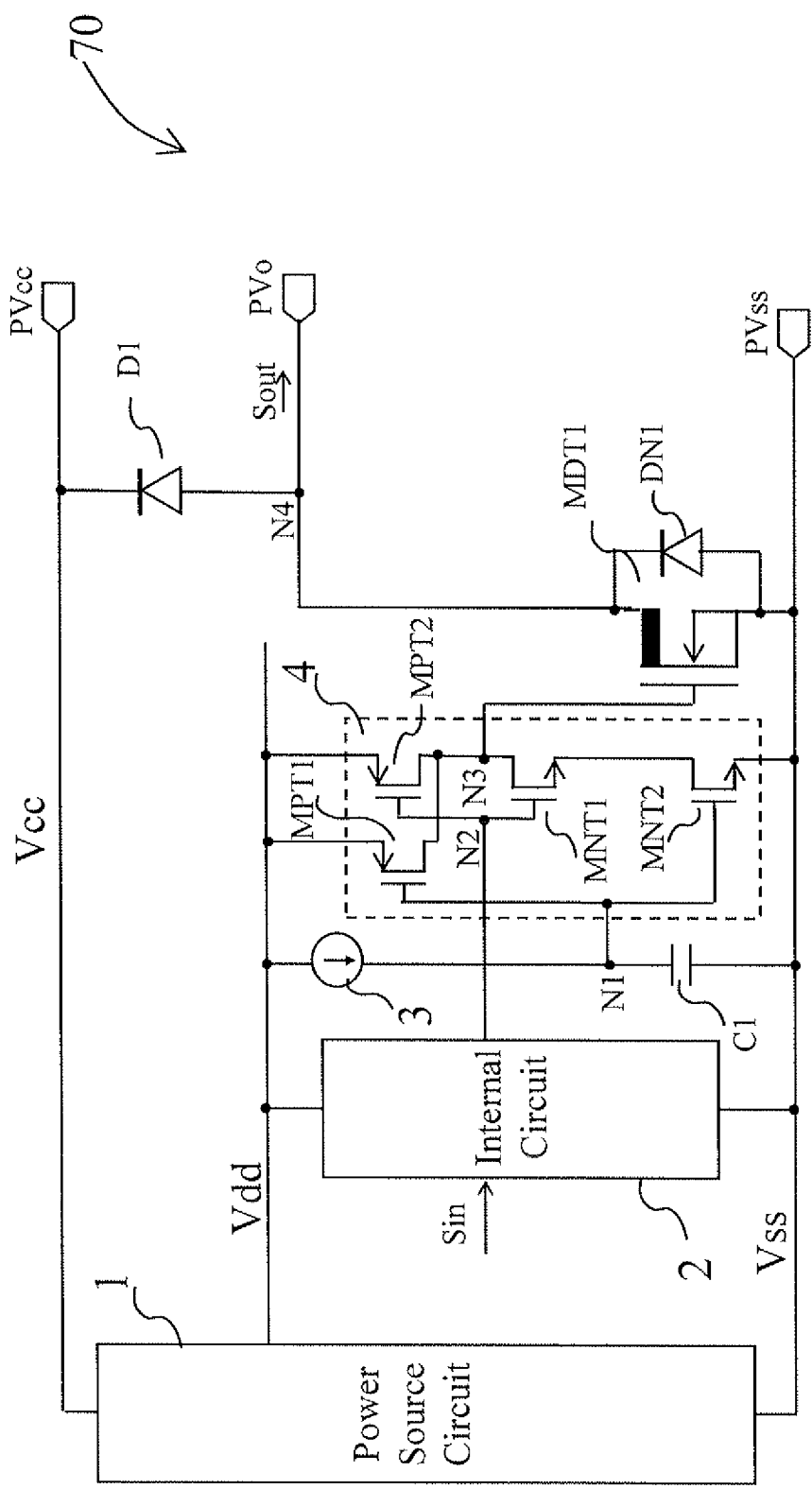
FIG. 1 is a circuit diagram illustrating a semiconductor integrated circuit device according to a first embodiment.

According to one embodiment, a semiconductor integrated circuit device includes: a power source circuit that is connected to a terminal of a first high potential side power source and that outputs a voltage of a second high potential side power source; an output transistor that includes a first terminal, a second terminal that is connected to a terminal of a low potential side power source, and a control terminal and that outputs an output signal from the first terminal to an output terminal; a first diode that includes a cathode connected to the terminal of the first high potential side power source and an anode connected to the output terminal; a connection circuit that is connected between a terminal of the second high potential side power source and the terminal of the low potential side power source, and in which a current source and a capacitor are arranged in a cascade connection; and a logic circuit to which a signal obtained from a connection node of the current source and the capacitor and a control signal that controls on/off operations of the output transistor are inputted and which outputs a signal obtained by a logic operation to the control terminal of the output transistor.

Further embodiments are described with reference to the drawings.

In the drawings, the same symbols indicate the same or similar parts. Below, a "MOS transistor" refers to an insulation gate field effect transistor.

A first embodiment is described with reference to FIG. 1. FIG. 1 is a circuit diagram illustrating the first embodiment.

In the present embodiment, when a positive ESD voltage is applied to an output terminal, an output transistor is turned on so that the ESD charge is quickly dissipated to a side of a low potential side power source (i.e. ground potential).

As shown in FIG. 1, a semiconductor integrated circuit device 70 includes a power source circuit 1, an internal circuit 2, a current source 3 and a 2-input NAND circuit 4, which is a logic circuit. Moreover, the semiconductor integrated circuit device 70 includes a capacitor C1, a diode D1 (first diode), an N-channel output transistor MDT1 and a terminal PVcc of a high potential side power source (first high potential side power source) Vcc. In addition, the semiconductor integrated circuit device 70 includes a terminal PVo as an output terminal and a terminal PVss of a low potential side power source (ground potential) Vss.

The semiconductor integrated circuit device 70 is a light receiving integrated circuit (IC) in a high current output photocoupler. Instead of such a light receiving IC, the semiconductor integrated circuit device 70 may be an integrated circuit that includes an open-drain type output transistor or an open-collector type output transistor and that are used in various consumer devices or industrial devices.

As described below, the current source 3, the capacitor C1 and the 2-input NAND circuit 4 cause a signal level of an output side node N3 of the 2-input NAND circuit 4 to become a "high" level (enabled state) when a positive ESD voltage is applied to the terminal PVo, which is the output terminal. By the setting of the level, the output transistor MDT1 is turned on, and the ESD charge is quickly dissipated to the side of the low potential side power source (ground potential) Vss.

The diode D1 is a protection diode provided between the high potential side power source Vcc and the terminal PVo. A cathode of the diode D1 is connected to the high potential side power source Vcc, and an anode thereof is connected to the terminal PVo, which is the output terminal.

A drain (first terminal) of the output transistor MDT1 is connected to the terminal PVo, and a source (second terminal) thereof is connected to the low potential side power source Vss. A signal outputted from the 2-input NAND circuit 4 is inputted to a gate (control terminal) of the output transistor MDT1. The output transistor MDT1 is an open-drain type N-channel double diffusion metal oxide semiconductor transistor (DMOS transistor), which outputs an output signal Sout from the drain side to the terminal PVo.

A diode DN1 (second diode) is incorporated in the output transistor MDT1. A cathode of the diode DN1 is connected to the drain of the output transistor MDT1, and an anode of the diode DN1 is connected to a source of the output transistor MDT1.

The power source circuit 1 is provided between the high potential side power source Vcc and the low potential side power source Vss. The power source circuit 1 starts operating when a voltage of the high potential side power source Vcc is supplied to from the terminal PVcc and generates a voltage of a high potential side power source (second high potential side power source) Vdd. The high potential side power source (second high potential side power source) Vdd supplies the voltage to the internal circuit 2, the current source 3 and the 2-input NAND circuit 4, and its voltage is set lower than the voltage of the high potential side power source (first high potential side power source) Vcc.

The internal circuit 2 is, for example, an arithmetic process circuit and a circuit that should be protected from the ESD. The internal circuit 2 could be any circuit different from the arithmetic process circuit. The internal circuit 2 is provided between the high potential side power source Vdd and the low potential side power source Vss. A control signal is outputted to a node N2 of the 2-input NAND circuit 4. The control signal is obtained by the following: an optical input signal Sin is inputted to the internal circuit 2; the optical input signal Sin is converted into an electrical signal by a light receiving element (not shown); then, arithmetic processing is conducted. Based on this control signal, the output transistor MDT 1 functions in either of on or off operation modes during a normal operation of the semiconductor integrated circuit device 70 (without ESD application).

A connection circuit is formed with the current source 3 and capacitor C1. One end of the current source 3 is connected to the high potential side power source Vdd, and the other end is connected to a node N1. The current source 3 is formed from a current mirror circuit, for example. One end of the capacitor C1 is connected to the node N1, and the other end is connected to an intermediate portion of the low potential side power source Vss. Because the current source 3 operates during normal operation of the semiconductor integrated circuit device 70 (without ESD application), the node N1 becomes a "high" level, which is a potential to which the voltage of the high potential side power source Vdd is lowered by a threshold voltage of the transistor configuring the current mirror circuit in the current source 3.

The 2-input NAND circuit 4 is provided between the high potential side power source Vdd and the low potential side power source Vss. Signals of the nodes N1 and N2 are inputted to the 2-input NAND circuit 4. The 2-input NAND circuit 4 performs logical operations on the signals from the nodes N1 and N2 and outputs the resulting signal (logic signal) from the node N3 to the gate of the output transistor MDT1. In the 2-input NAND circuit 4, an N-channel MOS transistor MNT1, an N-channel MOS transistor MNT2, a P-channel MOS transistor MPT1, and a P-channel MOS transistor MPT2 are provided.

Of the P-channel MOS transistor MPT1, a source is connected to the high potential side power source Vdd, a gate is connected to the node N1, and a drain is connected to the node N3. Of the P-channel MOS transistor MPT2, a source is connected to the high potential side power source Vdd, a gate is connected to the node N2, and a drain is connected to the node N3. Of the N-channel MOS transistor MNT1, a drain is connected to the node N3, a gate is connected to the node N2. Of the N-channel MOS transistor MNT2, a drain is connected to the source of the N-channel MOS transistor MNT1, a gate is connected to the node N1, and a source is connected to the low potential side power source Vss.

When the signal of the node N1 is a "low" level and the signal of the node N2 is a "low" level, the signal of the node N3 becomes a "high" level (enabled state). When the signal of the node N1 is a "low" level and the signal of the node N2 is a "high" level, the signal of the node N3 becomes a "high" level (enabled state). When the signal of the node N1 is a "high" level and the signal of the node N2 is a "low" level, the signal level at the node N3 becomes a "high" level (enabled state). When the signal of the node N3 is a "high" level (enabled state), the output transistor MDT1 is turned on (on operation mode).

On the other hand, when the signal of the node N1 is a "high" level and the signal of the node N2 is a "high" level, the signal of the node N3 becomes a "low" level (disabled state). When the signal of the node N3 is a "low" level (disabled state), the output transistor MDT1 is turned off (off operation mode).

The above-described first embodiment is compared with a comparative example shown in FIG. 2 below.

Figure 2:
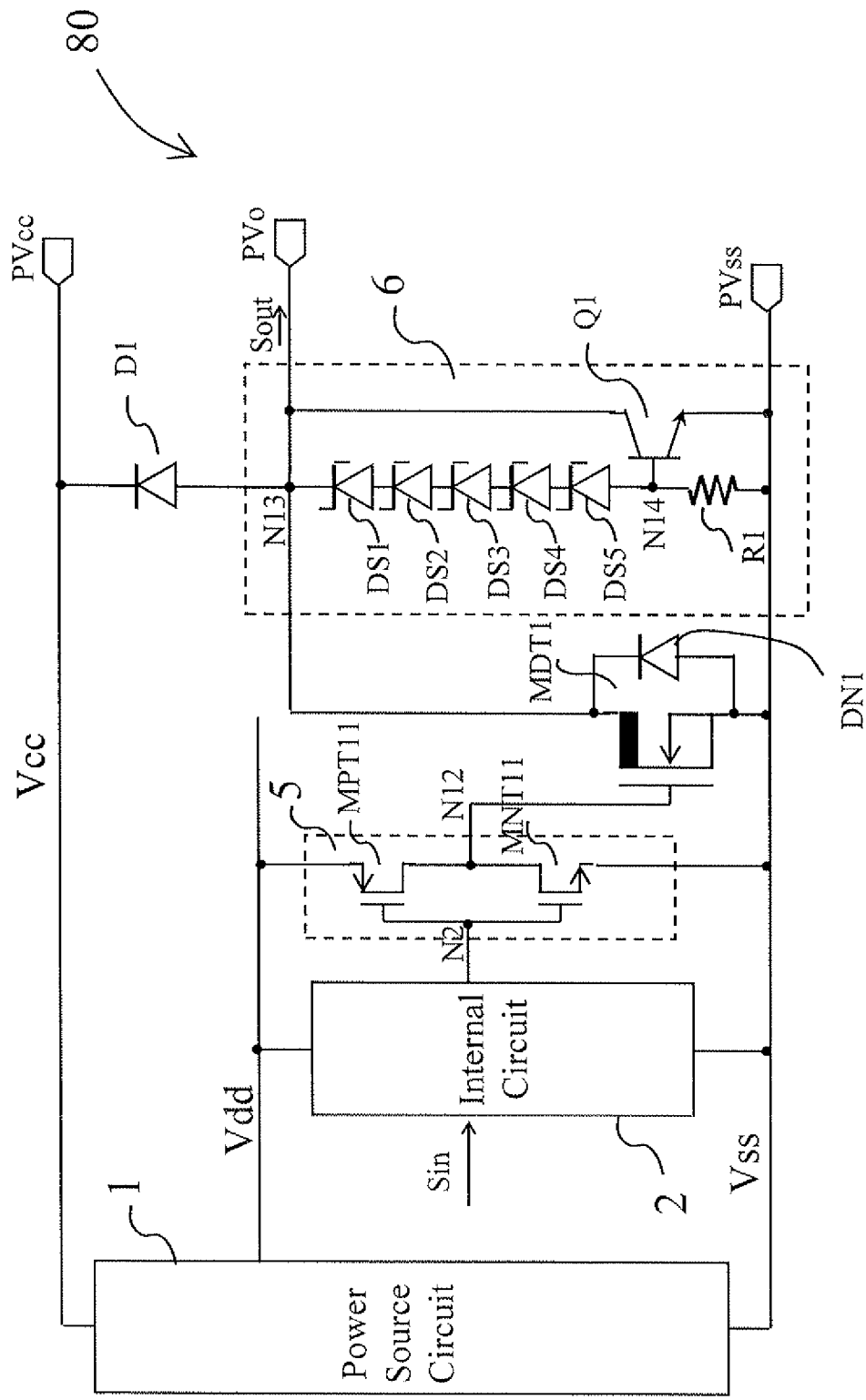
FIG. 2 is a circuit diagram illustrating a semiconductor integrated circuit device according to a comparative example.

As shown in FIG. 2, similar to the first embodiment, the power source circuit 1, the internal circuit 2, the diode D1 (first diode), the output transistor MDT1, the terminal PVcc, the terminal PVo and the terminal PVss are provided in a semiconductor integrated circuit device 80 of the comparative example. Further, an inverter 5 and an ESD protection circuit 6 are provided in the semiconductor integrated circuit device 80. Similar to the first embodiment, the semiconductor integrated circuit device 80 is a light receiving IC in a high current output photocoupler, for example.

Of the output transistor MDT1, a drain (first terminal) is connected to the terminal PVo, and a source (second terminal) is connected to the low potential side power source (ground potential) Vss. A control signal outputted from the internal circuit 2 is supplied to the node N2.

The inverter 5 is provided between the high potential side power source Vdd and the low potential side power source Vss. A signal of the node N2 is inputted to the inverter 5. The inverter 5 outputs a signal, which is an inverted signal of the node N2, to a gate (control terminal) of the output transistor MDT1 through an output side node N12.

The ESD protection circuit 6 is provided between the terminal PVo and the low potential side power source Vss and protects the output transistor MDT 1 and the other internal elements that form the semiconductor integrated circuit 80. The ESD protection circuit 6 operates as an active clamp circuit. Diodes DS1 to DS5 (second diodes), a resistor R1 and an NPN transistor Q1 are provided in the ESD protection circuit 6. The ESD protection circuit 6 requires a relatively large footprint area for protecting the output transistor MDT1 and the internal elements from the ESD.

The diodes DS1 to DS5 are Zener diodes and are provided between a node N13 and a node N14. Of the diodes DS1 to DS5, cathodes are arranged in a direction toward the node N13, and anodes are arranged in a direction toward the node N14 so that the diodes form a cascade connection. Of the resistor R1, one end is connected to the node N14, and the other end is connected to the low potential side power source Vss. Of the NPN transistor Q1, a collector is connected to the node N13 and the terminal PVo, a base is connected to the node N14, and an emitter is connected to the low potential side power source Vss.

A period during which the ESD voltage is applied to the terminal PVo is between 1 ns and 10 ns. In the semiconductor integrated circuit device 80 of the comparative example, when lowering the resistance of the output transistor MDT1 is a high priority, for example, the ESD protection circuit 6 is provided at a distance from the terminal PVo. In this case, a response time of the ESD protection circuit 6 is delayed. Accordingly, the charge absorbed by the ESD protection circuit 6 is insufficient, and as a result the ESD protection circuit 6 is unable to improve the ESD durability.

A protection operation of the semiconductor integrated circuit device 70 according to the first embodiment is described with reference to FIGS. 3-7.

Figure 3:
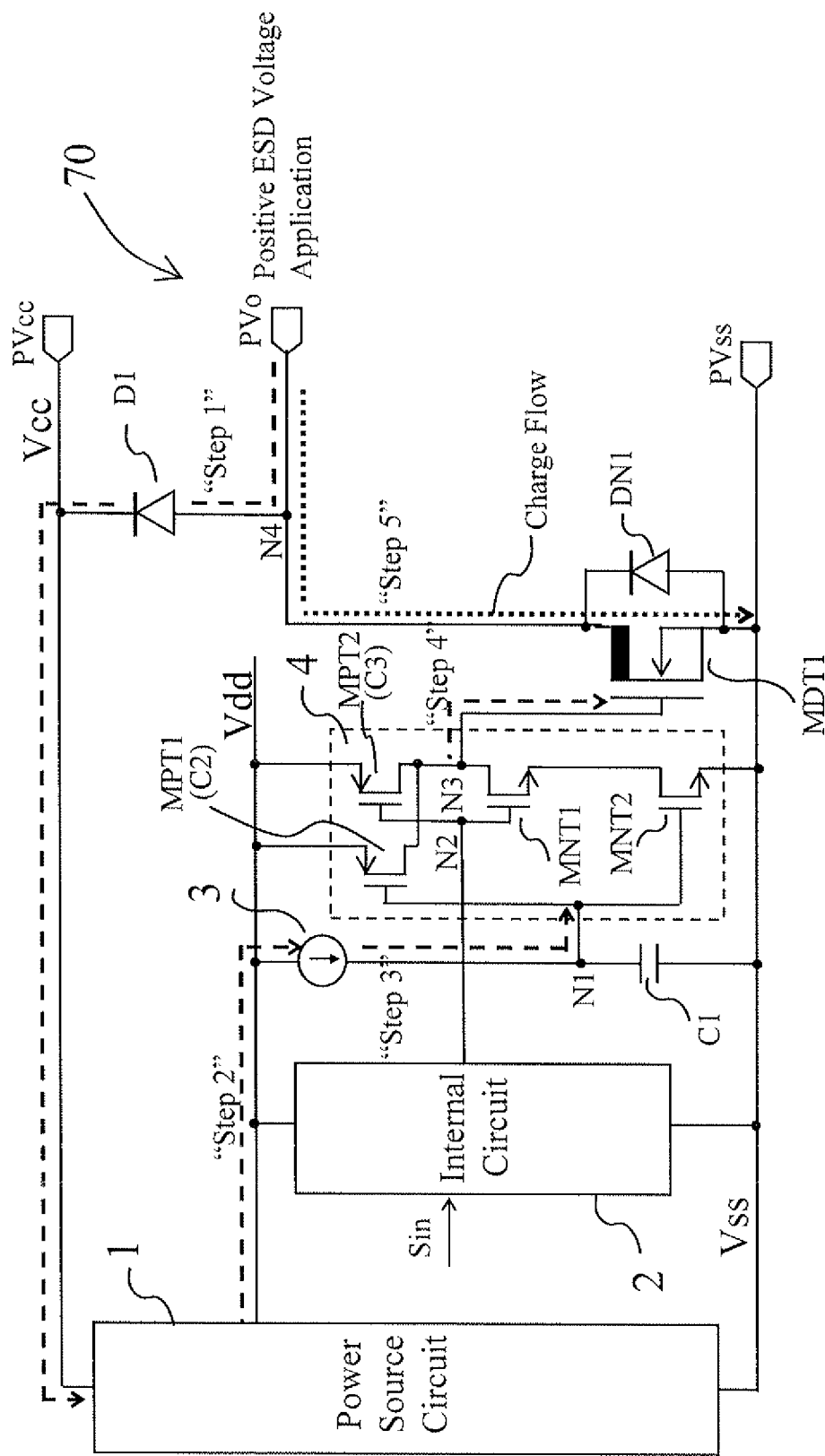
FIG. 3 is a circuit diagram illustrating an ESD protection operation when a positive ESD voltage is applied to an output terminal of the semiconductor integrated circuit device according to the first embodiment.

FIG. 3 shows an ESD protection operation in the case where a positive ESD voltage is applied to the output terminal of the semiconductor integrated circuit device 70. Arrows with broken lines indicate the direction in which the positive charges flow.

As shown in FIG. 3, when the positive ESD voltage is applied to the terminal PVo, a potential (electric potential) of the high potential side power source (first high potential side power source) Vcc rises because the diode D1, which is a protection diode, is biased in a forward direction (step 1). Due to the rising of the potential of the power source Vcc, a potential of the high potential side power source (second high potential side power source) Vdd, which is outputted from the power source circuit 1, instantaneously rises (step 2).

Even with the instantaneous rising of the potential of the power source Vdd, because the current source 3 formed with a current mirror circuit has a slow response speed upon application of the ESD voltage, the current source 3 does not operate. Therefore, the charge is distributed among a capacitance of the capacitor C1, a gate capacitance C2 of the P-channel MOS transistor MPT1 and a gate capacitance C3 of the N-channel MOS transistor MNT2.

When the capacitance of the capacitor C1 is sufficiently larger than the gate capacitance C2 of the P-channel MOS transistor MPT1 and the gate capacitance C3 of the N-channel MOS transistor MNT2, the potential of the node N1 becomes a "low" level, and the P-channel MOS transistor MPT1 is turned on (step 3).

In this state, regardless of whether the node N2, to which the control signal of the output transistor MDT1 is supplied, is a "low" level or a "high" level, a signal level of the output side node N3 of the 2-input NAND circuit 4 becomes a "high" level (enabled state) (step 4).

This signal of the node N3 being the "high" level (enabled state) is inputted to the gate of the output transistor MDT1, and thereby the output transistor MDT1 is turned on. When the output transistor MDT1 is on, the positive charge of the ESD is quickly dissipated to the side of the low potential side power source Vss (step 5).

As described above, to perform the ESD protection operation, it is necessary that the node N1 is a "low" level and that the P-channel transistor MPT1 is turned on. In this case, the node N3 becomes a "high" level regardless of whether the node N2 is a "low" level or a "high" level. As a result, the protection operation is performed when the output transistor MDT1 is turned on.

The operations in the above-described steps 1 to 5 of the semiconductor integrated circuit device 70 according to the first embodiment are more quickly performed than those of the semiconductor integrated circuit device 80 of the comparative example shown in FIG. 2 for the reasons discussed below.

After a predetermined period has elapsed, during which the ESD voltage is applied and the ESD charge is discharged, the current source 3 starts its operation, and the potential of the node N1 becomes a "high" level by the current outputted from the current source 3, thereby allowing the normal operation to proceed (it is possible to return to normal operation).

Figure 4:
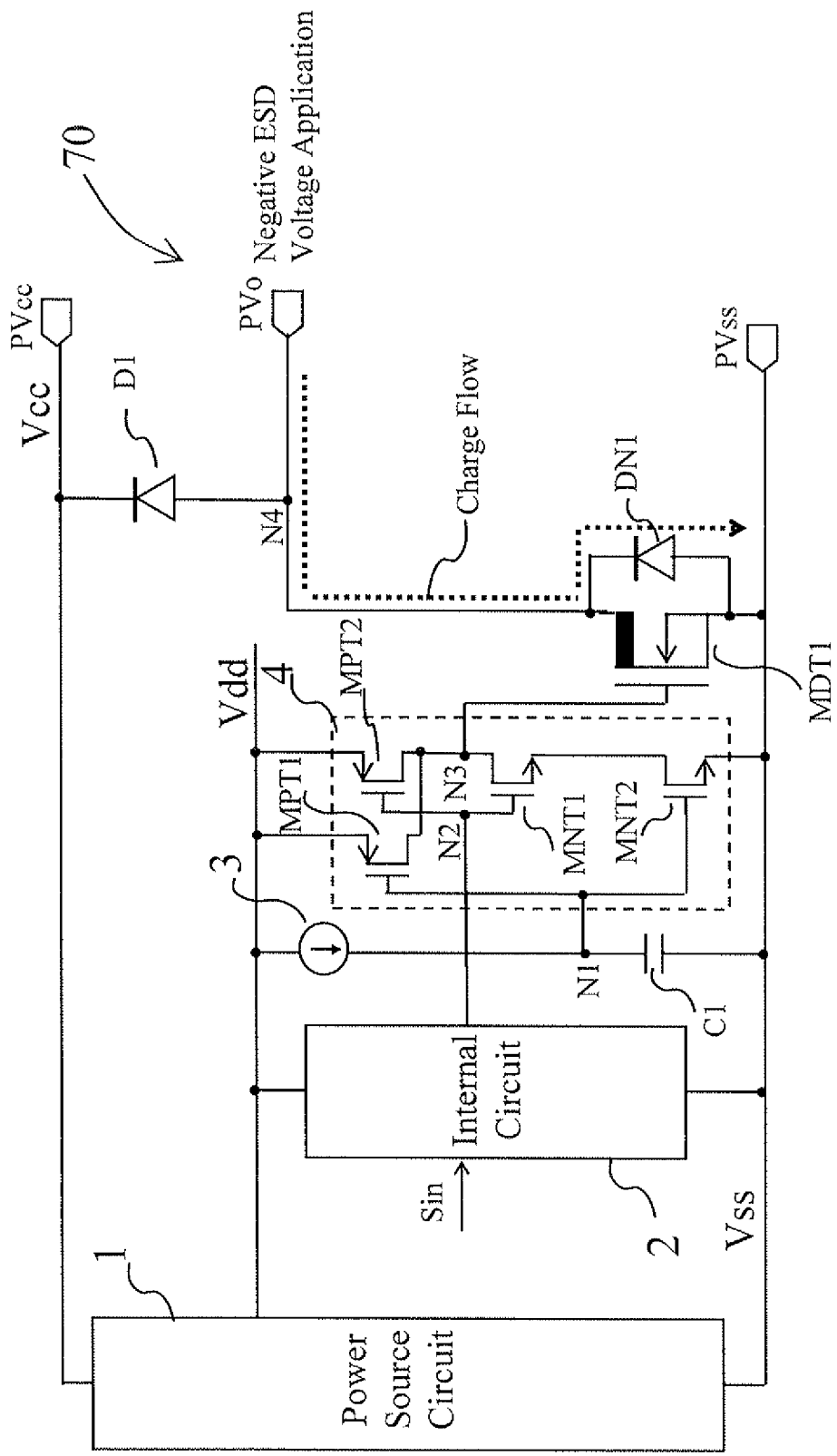
FIG. 4 is a circuit diagram illustrating an ESD protection operation when a negative ESD voltage is applied to the output terminal of the semiconductor integrated circuit device according to the first embodiment.

FIG. 4 is a circuit diagram illustrating the ESD protection operation when a negative ESD charge is applied to the output terminal of the semiconductor integrated circuit device 70 according to the first embodiment. An arrow with a broken line indicates the direction in which the negative charge flows.

As shown in FIG. 4, when the negative ESD voltage is applied to the terminal PVo, the diode DN1 incorporated into the output transistor MDT1 is biased in a forward direction. Therefore, the negative charge quickly flows to the side of the low potential side power source Vss through the diode DN1.

Figure 5:
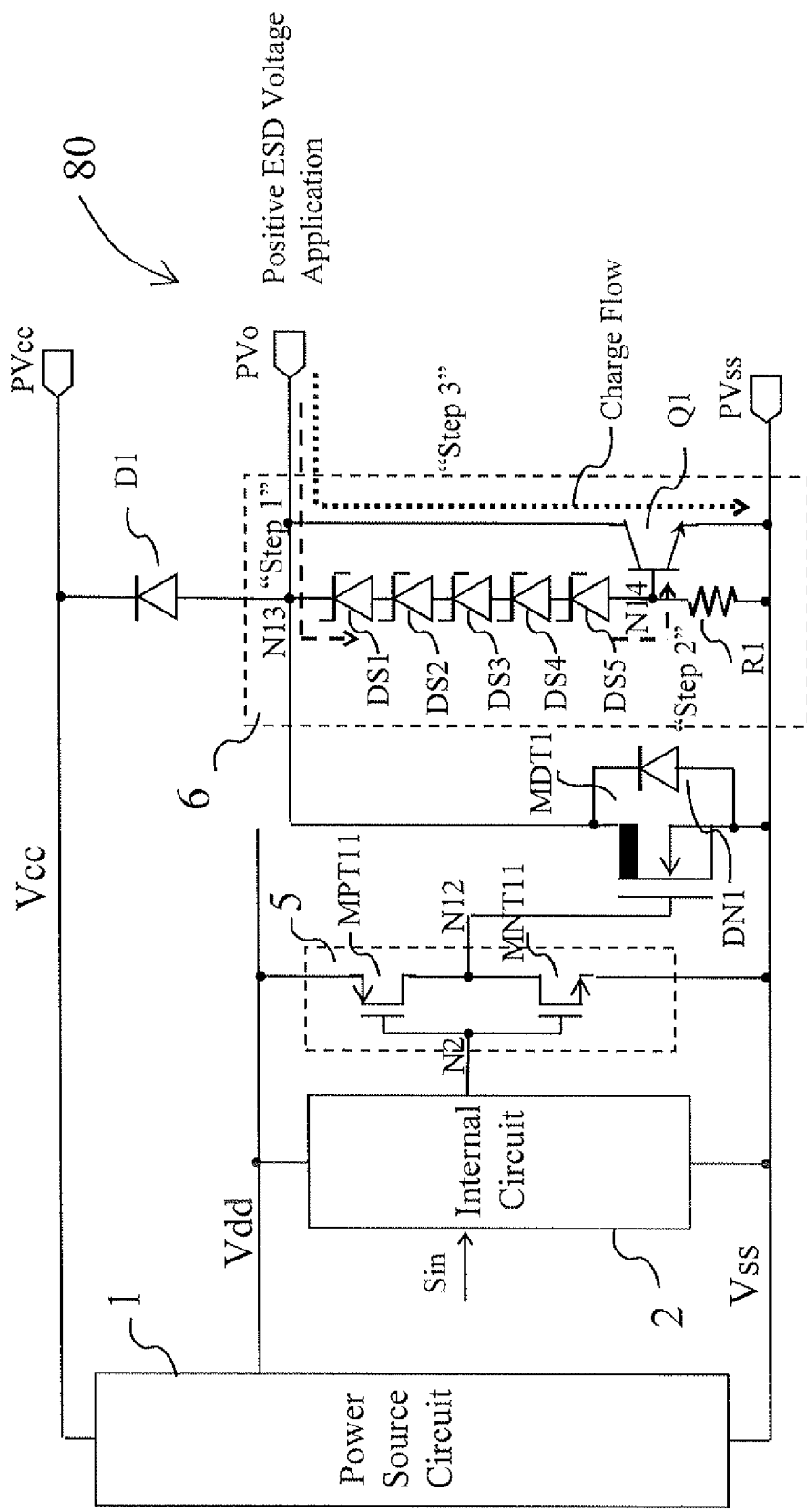
FIG. 5 is a circuit diagram illustrating an ESD protection operation when a positive ESD voltage is applied to an output terminal of the semiconductor integrated circuit device of the comparative example according to the first embodiment.

FIG. 5 shows an ESD protection operation when a positive ESD voltage is applied to the output terminal of the semiconductor integrated circuit device 80 of the comparative example shown in FIG. 2. An arrow with a broken line indicates the direction in which the positive charge flows.

As shown in FIG. 5, when the positive ESD voltage is applied to the terminal PVo, the potential of the node N13 rises (step 1).

As a result, the current flows in a reverse direction through the diodes DS1 to DS5 in the cascade connection, the potential of the node N14 rises, and thereby the NPN transistor Q1 is turned on (step 2).

As the NPN transistor Q1 is turned on, the positive charge of the ESD is dissipated to the side of the low potential side power source Vss (step 3).

The protection operation in steps 1 through 3 of the comparative example is slower than that of the semiconductor integrated circuit device 70 of the present embodiment. The reason is because the ESD protection circuit 6 of the comparative example does not operate during normal operation and does not operate until the application ESD voltage reaches at least a predetermined value.

When the positive ESD voltage is applied to the terminal PVo, a portion of the charge arrives the diode D1, the high potential side power source Vcc, the power source circuit 1 and the high potential side power source Vdd. As a result, the voltage outputted from the internal circuit 2 to the node N2 becomes unstable, so that the output transistor MDT1 may not necessarily be turned on. In other words, when the positive ESD voltage is applied to the terminal PVo, the output transistor MDT1 is not necessarily turned on or off based on a control signal received from the node N2.

Figure 6:
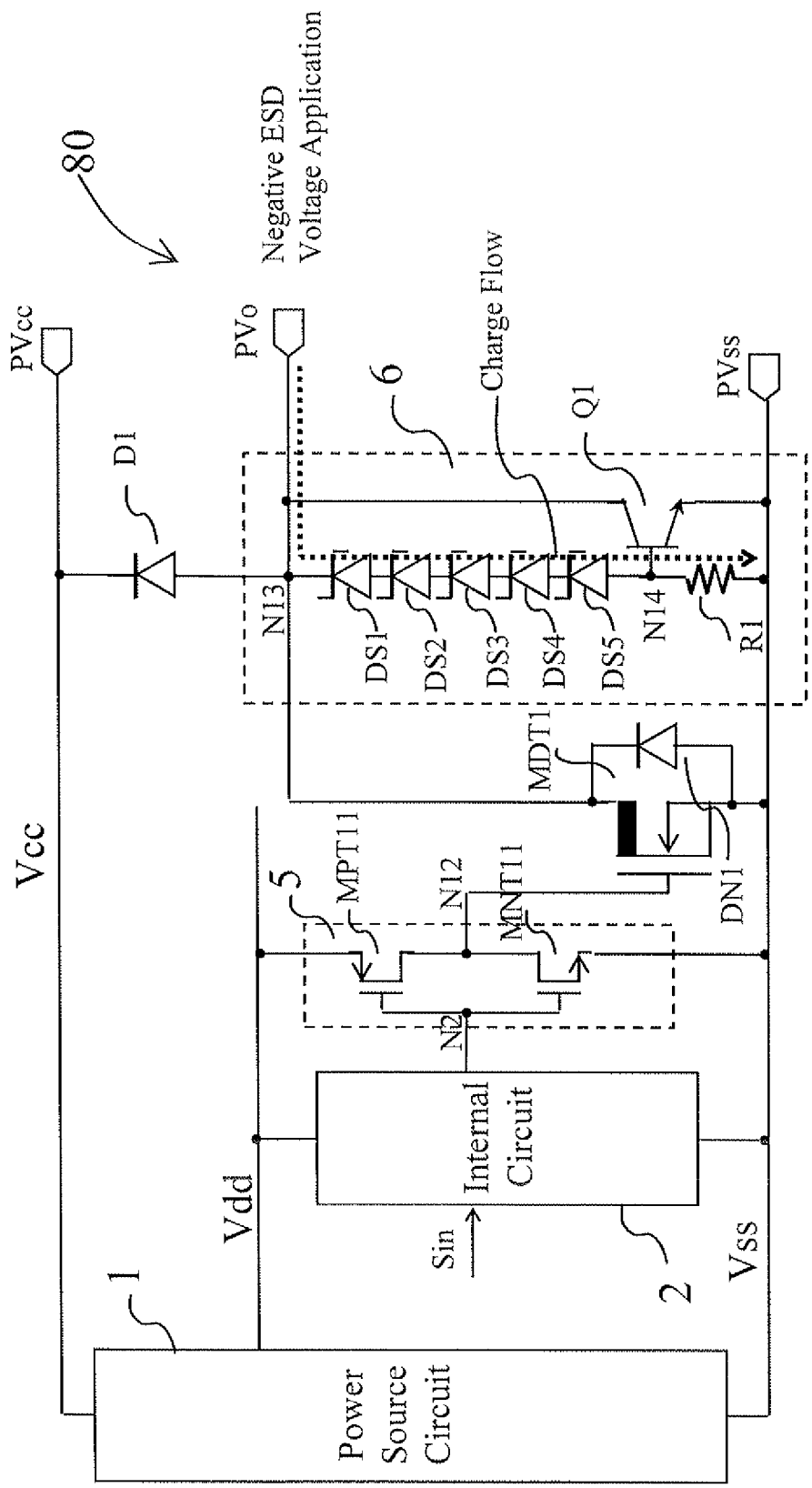
FIG. 6 is a circuit diagram illustrating an ESD protection operation when a negative ESD voltage is applied to the output terminal of the semiconductor integrated circuit device of the comparative example according to the first embodiment.

FIG. 6 is a circuit diagram illustrating the ESD protection operation when a negative ESD voltage is applied to the output terminal of the semiconductor integrated circuit device 80 of the comparative example.

As shown in FIG. 6, when the negative ESD voltage is applied to the terminal PVo, because the diodes DS1 to DS5 in the cascade connection are biased in the forward direction, the charge quickly flows to the side of the low potential side power source Vss through the diodes DS1 to DS5 and the resistor R1.

Figure 7B:
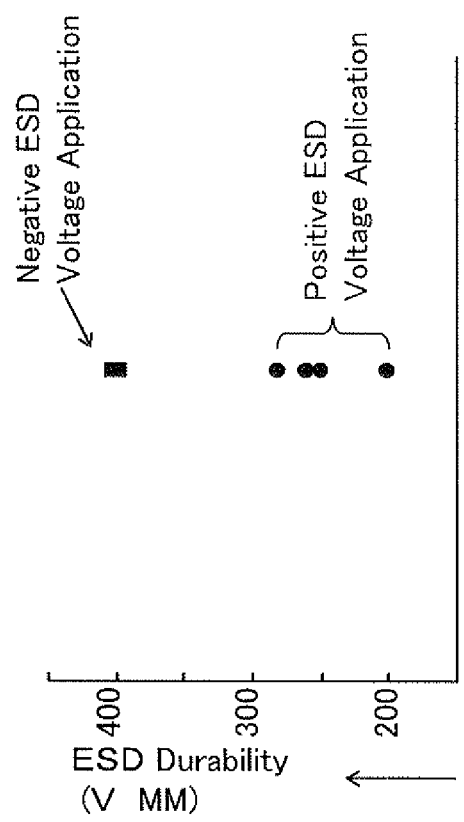
FIG. 7B is a diagram showing characteristics of ESD durability of the comparative example.
Figure 7A:
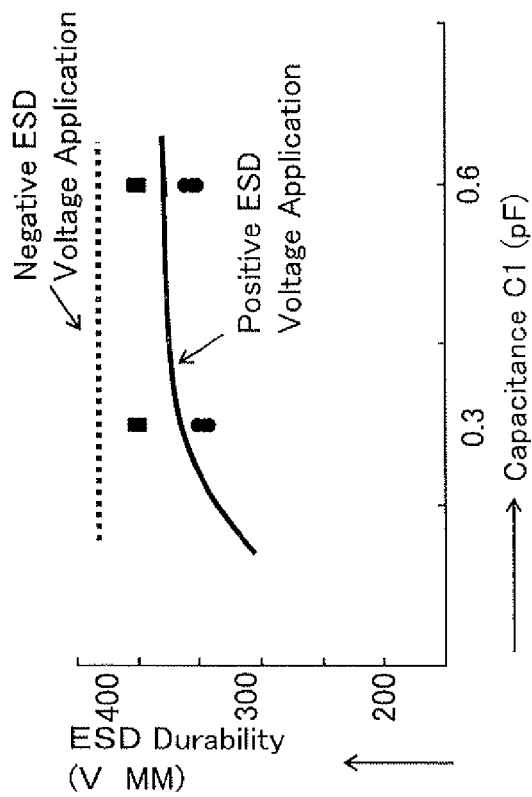
FIG. 7A is a diagram showing characteristics of ESD durability according to the first embodiment.

FIG. 7A is a diagram showing characteristics of ESD durability of the present embodiment. FIG. 7B is a diagram showing characteristics of ESD durability of the comparative example. For measurement of these characteristics, the MM (machine model), namely mechanical charge model, is used, a capacitance of a capacitor for the measuring device is set to 200 pF, and a no-load condition is applied. In this case, an ESD durability of approximately ±200 V is normally required.

As shown in FIG. 7B, in the semiconductor integrated circuit device 80 of the comparative example, the ESD durability in the case when a negative ESD voltage is applied to the terminal PVo is −400 V. When a positive ESD voltage is applied to the terminal PVo, the response speed of the ESD protection circuit 6 is slow, and the operation of the output transistor MDT1 becomes unstable. Accordingly, it is concluded that the ESD durability has significant fluctuations of +200 V as the minimum value, +280 V as the maximum value, and +247 V as the average value. The minimum value of the ESD durability is the same as the standard value of the ESD durability. The average value of the ESD durability is also a lower value compared with the case where a negative ESD voltage is applied.

In contrast, as shown in FIG. 7A, in the semiconductor integrated circuit device 70 of the present embodiment, the ESD durability in the case when a negative ESD voltage is applied to the terminal PVo is −400 V, which is the same as the comparative example. In the semiconductor integrated circuit device 70, because the output transistor MDT1 operates quickly to allow the charge to flow to the side of the low potential side power source Vss when a positive ESD voltage is applied to the terminal PVo, the ESD durability is improved compared with the comparative example. For example, when the capacitance of the capacitor C1 is 0.3 pF, the ESD durability is +345 V, which is 1.39 times as large as the average value of the comparative example. If the capacitance of the capacitor C1 is 0.6 pF, the ESD durability is +355 V, which is 1.43 times as large as the average value of the comparative example. Significant improvements may not be expected even if the capacitance of the capacitor C1 is more than 0.6 pF.

As discussed above, the 2-input NAND circuit 4 is provided in the semiconductor integrated circuit device 70 of the present embodiment. The current source 3 and the capacitor C1 are connected to the 2-input NAND circuit 4. When a positive ESD voltage is applied to the terminal PVo, a signal level at the output side node N3 of the 2-input NAND circuit 4 becomes a "high" level. As the output transistor MDT1 is turned on, the ESD charge is dissipated to the side of the low potential side power source Vss.

Therefore, the ESD durability of the semiconductor integrated circuit device 70 can be improved. Further, compared with a case in which an ESD protection circuit, such as an active clamp circuit, is provided, a chip area of the semiconductor integrated circuit device 70 can be reduced.

In the present embodiment, a DMOS transistor is used for the output transistor. However, a trench power MOS transistor, an insulation gate bipolar transistor (IGBT) or the like may be used instead. In the present embodiment, the 2-input NAND circuit 4 is used as a logic circuit. However, a NAND logic circuit, in which an inverter and a 2-input NOR circuit are combined, for example, may be used instead.

Figure 8:
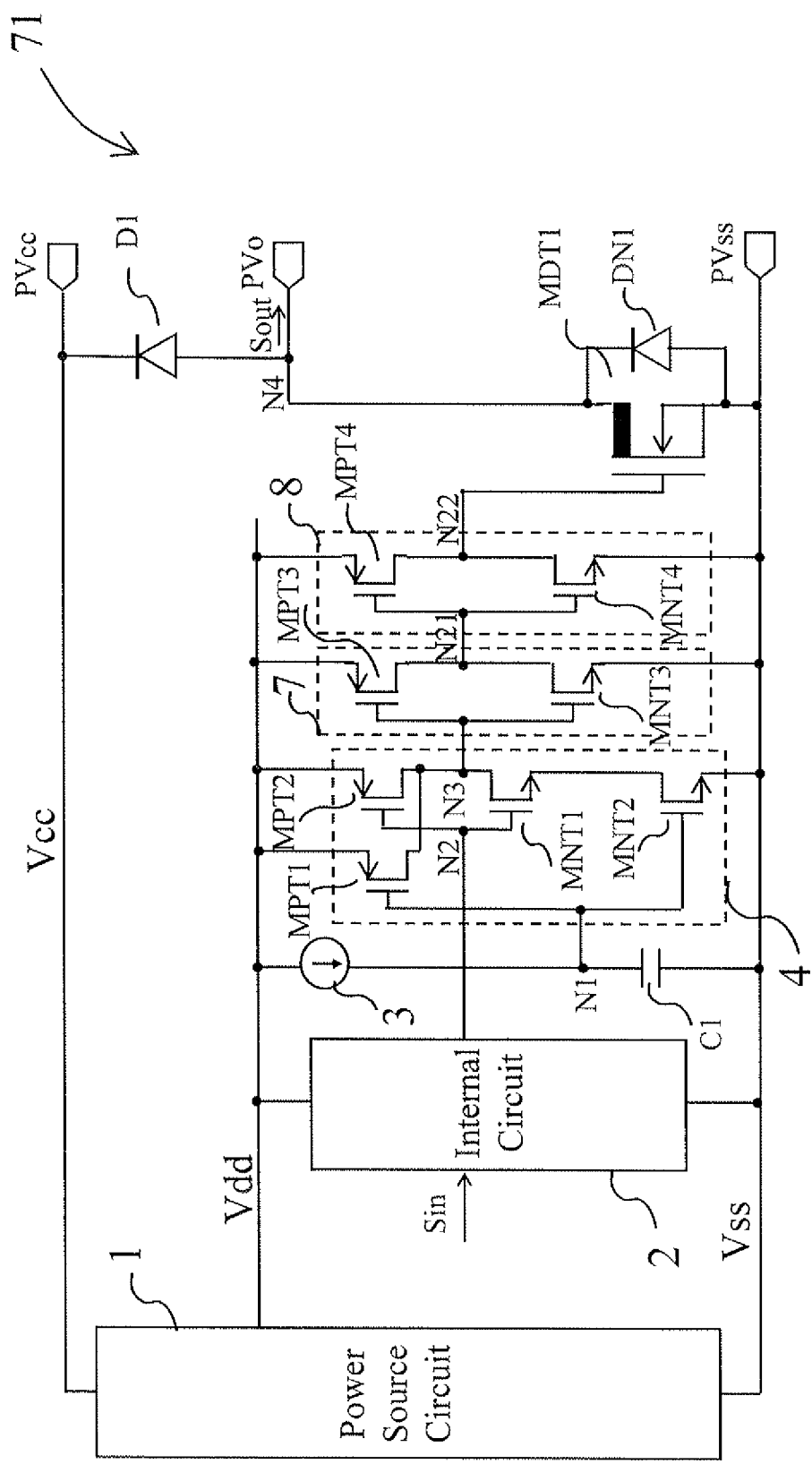
FIG. 8 is a circuit diagram illustrating a semiconductor integrated circuit device according to a second embodiment.

Next, a semiconductor integrated circuit device according to a second embodiment is described with reference to FIG. 8. FIG. 8 is a circuit diagram illustrating a semiconductor integrated circuit device 71.

In the present embodiment, inverters are provided between an output side of a 2-input NAND circuit and a gate of an output transistor.

The semiconductor integrated circuit device 71 is a light receiving IC in a high current output photocoupler, for example.

The current source 3, the capacitor C1, the 2-input NAND circuit 4 and inverters 7 and 8 switch a signal level of an output side node N22 of the inverter 8 to a "high" level (enabled state) when a positive ESD voltage is applied to the terminal PVo. As a result, the output transistor MDT 1 is turned on, and the ESD charge is quickly dissipated to the side of the low potential side power source Vss.

The inverter 7 is provided between the high potential side power source Vdd and the low potential side power source Vss. The inverter 7 receives a signal inputted from the node N3 and outputs an inverted signal from an output side node N21. A P-channel MOS transistor MPT3 and an N-channel MOS transistor MNT3, which are connected to each other, are provided in the inverter 7.

Of the P-channel MOS transistor MPT3, a source is connected to the high potential side power source Vdd, and a gate is connected to the node N3. Of the N-channel MOS transistor MNT3, a drain is connected to a drain of the P-channel MOS transistor MPT3, a gate is connected to the node N3, and a source is connected to the low potential side power source Vss.

The inverter 8 is provided between the high potential side power source Vdd and the low potential side power source Vss. The inverter 8 receives a signal from the node N21 and outputs an inverted signal from an output side node N22. A P-channel MOS transistor MPT4 and an N-channel MOS transistor MNT4, which are connected each other, are provided in the inverter 8.

Of the P-channel MOS transistor MPT4, a source is connected to the high potential side power source Vdd, and a gate is connected to the node N21. Of the N-channel MOS transistor MNT4, a drain is connected to a drain of the P-channel MOS transistor MPT4, a gate is connected to the node N21, and a source is connected to the low potential side power source (ground potential) Vss.

Because the inverters 7 and 8, which are in a cascade connection, are provided between the 2-input NAND circuit 4 and the output transistor MDT1, a size of the transistor that forms the 2-input NAND circuit 4 is made smaller than that of the first embodiment. Therefore, the chip area of the semiconductor integrated circuit device 71 is reduced. The reasons are described below.

Because it is necessary to increase the size of the output transistor MDT1 used for output of the semiconductor integrated circuit devices 70 and 71 shown in FIGS. 1 and 8 to enable high current output, it is also necessary to increase the size of circuit elements in a preceding stage that drive the output transistor MDT1.

Therefore, it is necessary to increase the size of the two P-channel MOS transistors and the two N-channel MOS transistors that form the 2-input AND circuit 4 in FIG. 1. On the other hand, in the semiconductor integrated circuit device 71 shown in FIG. 8, sizes of the elements have only to be gradually increased from the 2-input NAND circuit 4 to the inverters 7 and 8. Therefore, the semiconductor integrated circuit device 71 may be made smaller than the semiconductor integrated circuit device 70 shown in FIG. 1.

As described above, in the semiconductor integrated circuit device 71 of the present embodiment, the current source 3, the 2-input NAND circuit 4, the inverter 7, the inverter 8 and the capacitor C1 are provided.

These elements switch the signal level of the output side node N22 of the inverter 8 to a "high" level when a positive ESD voltage is applied to the terminal PVo. As a result, the output transistor MDT1 is turned on, and the ESD charge is quickly dissipated to the side of the low potential side power source Vss.

In the present embodiment, the two stages of the inverters are arranged next to the 2-input NAND circuit 4. However, the configuration is not necessarily limited to this. For example, the inverters may be provided in an even-number-stage configuration including four or more stages.

Figure 9:
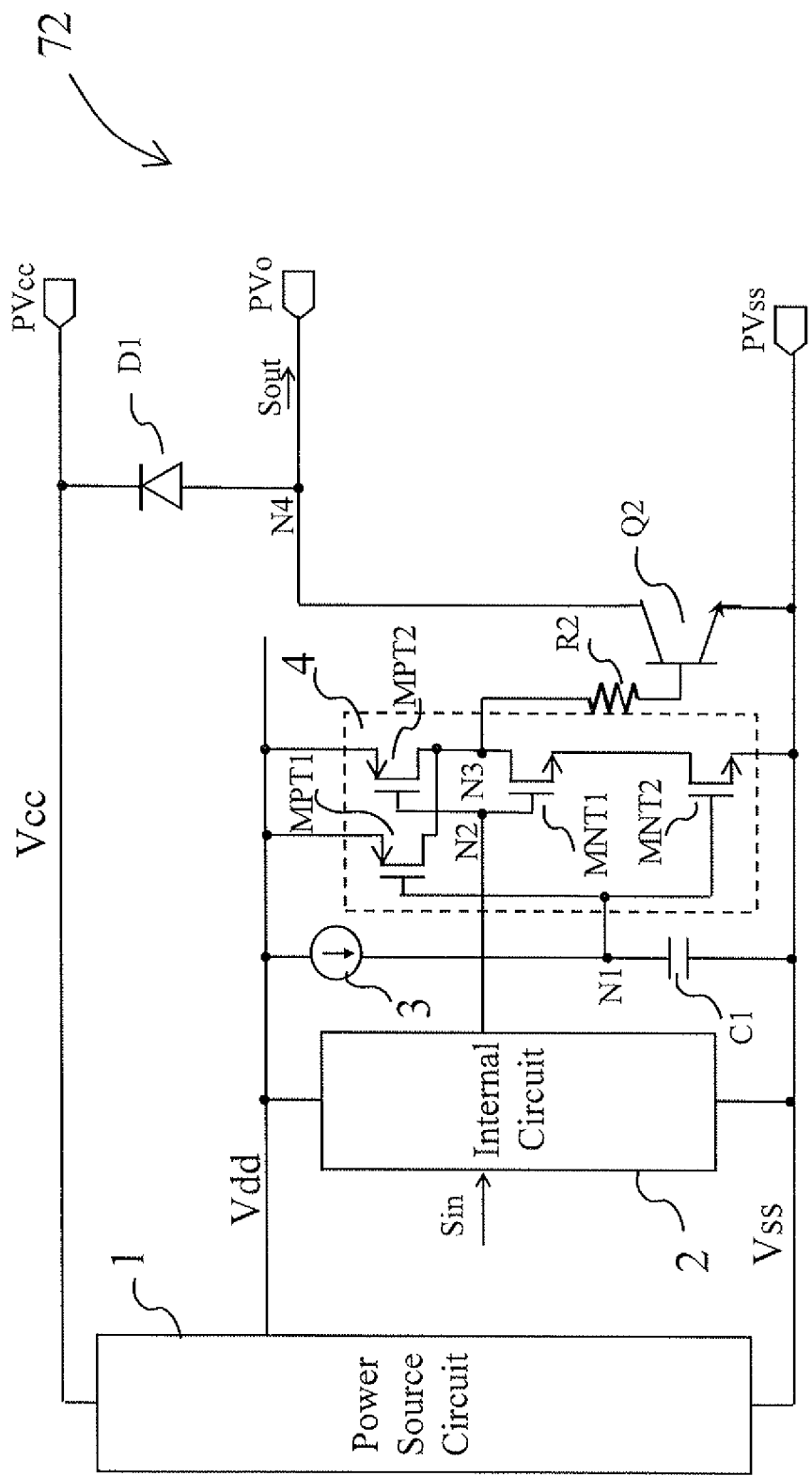
FIG. 9 is a circuit diagram illustrating a semiconductor integrated circuit device according to a third embodiment.

A semiconductor integrated circuit device according to a third embodiment is described with reference to FIG. 9. FIG. 9 is a circuit diagram illustrating such a semiconductor integrated circuit device.

The present embodiment uses an NPN transistor for the output transistor.

As shown in FIG. 9, the current source 3, the 2-input NAND circuit 4, the capacitor C1 and an output transistor Q2 are provided in a semiconductor integrated circuit device 72. The semiconductor integrated circuit device 72 is a light receiving IC in a high current output photocoupler, for example.

The current source 3, the capacitor C1 and the 2-input NAND circuit 4 switch a signal level of the output side node N3 of the 2-input NAND circuit 4 to a "high" level (enabled state) when a positive ESD voltage is applied to the terminal PVo. As a result, the output transistor Q2 is turned on, and the ESD charge is quickly dissipated to the side of the low potential side power source Vss.

One end of a resistor R2 is connected to the node N3, and the other end is connected to a base of the output transistor Q2.

Of the output transistor Q2, a collector (first terminal) is connected to the terminal PVo, and an emitter (second terminal) is connected to the low potential side power source (ground potential) Vss. In addition, the signal outputted from the 2-input NAND circuit 4 is inputted to a base (control terminal) of the output transistor Q2 through the resistor R2. The output transistor Q2 is an open-collector NPN transistor. The output transistor Q2 outputs an output signal Sout from the collector side to the terminal PVo.

As discussed above, in the semiconductor integrated circuit device of the present embodiment, the current source 3, the capacitor C1 and the 2-input NAND circuit 4 are formed to switch a signal level of the output side node N3 of the 2-input NAND circuit 4 to a "high" level when a positive ESD voltage is applied to the terminal PVo. As a result, the output transistor Q2 is turned on, and the ESD charge is quickly dissipated to the side of the low potential side power source Vss.

Therefore, the ESD durability of the semiconductor integrated circuit device 72 can be improved. In addition, compared with the case where an ESD protection circuit, such as an active clamp circuit, is provided, a chip area of the semiconductor integrated circuit 72 can be reduced.

Figure 10:
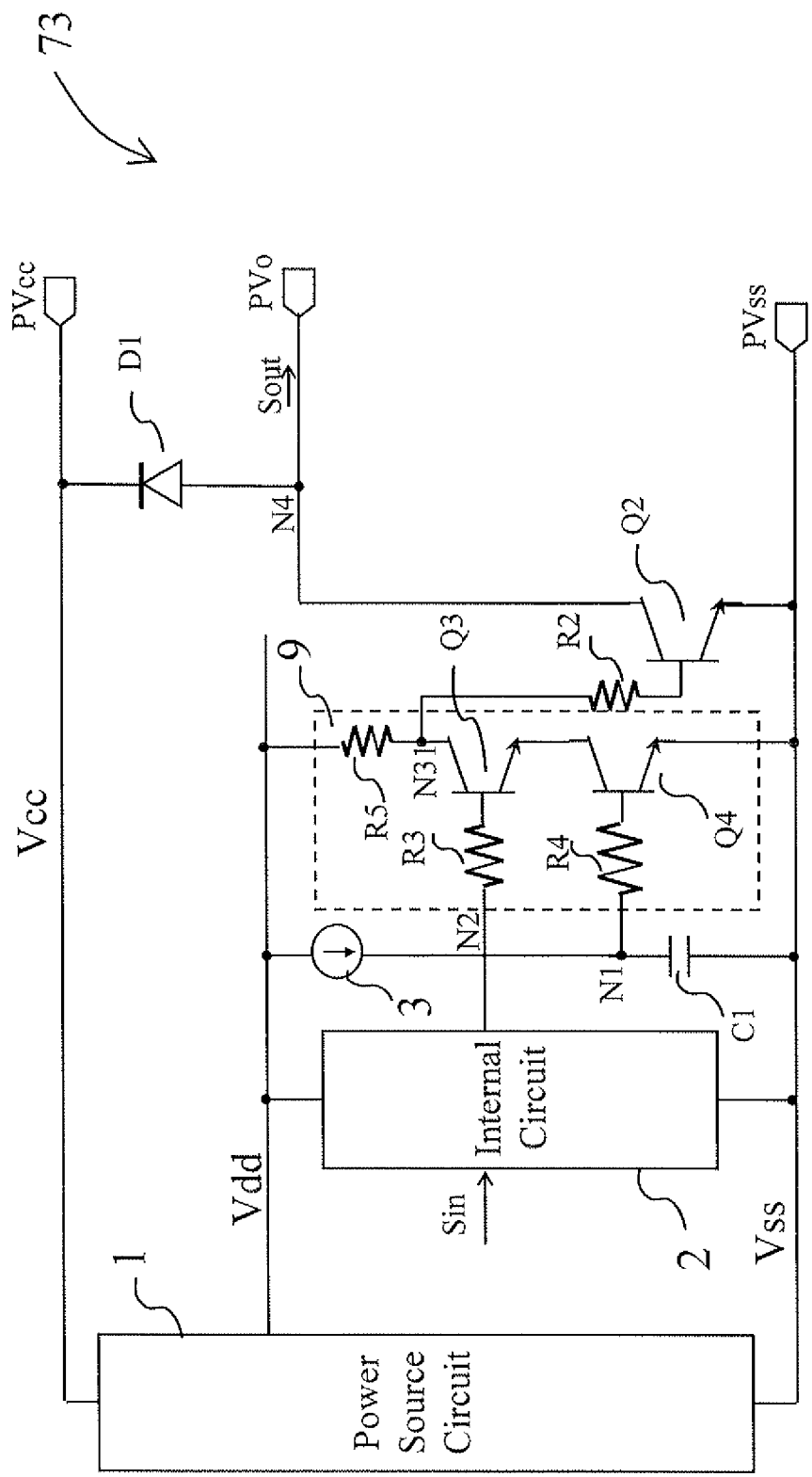
FIG. 10 is a circuit diagram illustrating a semiconductor integrated circuit device according to a fourth embodiment.

A semiconductor integrated circuit device according to a fourth embodiment is described with reference to FIG. 10. FIG. 10 is a circuit diagram illustrating such semiconductor integrated circuit device.

In the present embodiment, a NAND circuit that is formed with a bipolar transistor is provided at a stage preceding a base of an output transistor.

As shown in FIG. 10, the current source 3, a 2-input NAND circuit 9, the capacitor C1, a resistance R2 and the output transistor Q2 are provided in a semiconductor integrated circuit device 73. The semiconductor integrated circuit device 73 is a light receiving IC in a high current output photocoupler, for example.

The current source 3, the capacitor C1 and the 2-input NAND circuit 9 switch a signal level of the output side node N31 of the 2-input NAND circuit 9 to a "high" level (enabled state) when a positive ESD voltage is applied to the terminal PVo. As a result, the output transistor Q2 is turned on, and the ESD charge is quickly dissipated to the side of the low potential side power source (ground potential) Vss.

The 2-input NAND circuit 9 is provided between the high potential side power source (second high potential side power source) Vdd and the low potential side power source (ground potential) Vss. Resistors R3 to R5, an NPN transistor Q3 and an NPN transistor Q4 are provided in the 2-input NAND circuit 9.

An end of the resistor R3 is connected to the node N2. An end of the resistor R4 is connected to the node N1. One end of the resistor R5 is connected to the high potential side power source Vdd, and the other end is connected to the node N31.

Of the NPN transistor Q3, a collector is connected to the node N31, and the base is connected to the other end of the resistor R3. Of the NPN transistor Q4, a collector is connected to an emitter of the NPN transistor Q3, a base is connected to the other end of the resistor R4, and an emitter is connected to the low potential side power source Vss.

Of the resistor R2, one end is connected to the node N31, and the other end is connected to a base of the output transistor Q2.

Of the output transistor Q2, the collector (first terminal) is connected to the terminal PVo, and the emitter (second terminal) is connected to the low potential side power source Vss. A signal outputted from the node N31 of the 2-input NAND circuit 9 is inputted to the base (control terminal) of the output transistor Q2 through the resistor R2. The output transistor Q2 outputs an output signal Sout from the collector side to the terminal PVo.

The 2-input NAND circuit 9 receives signals from the node N1 and the node N2 and performs logical operations on these signals. The signals obtained from the logical operation process are outputted to the gate of the output transistor Q2 from the node N31 through the resistor R2.

As described above, the current source 3, the 2-input NAND circuit 9 including the two NPN transistors Q3 and Q4, the capacitor C1, the resistor R2 and the NPN type output transistor Q2 are provided in the semiconductor integrated circuit device 73 of the present embodiment. The current source 3, the capacitor C1 and the 2-input NAND circuit 9 switch the signal level of the output side node N31 of the 2-input NAND circuit 9 to a "high" level when a positive ESD voltage is applied to the terminal PVo. As a result, the output transistor Q2 is turned on, and the ESD charge is quickly dissipated to the side of the low potential side power source Vss.

Therefore, the ESD durability of the semiconductor integrated circuit device 73 can be improved. In addition, compared with the case where an ESD protection circuit, such as an active clamp circuit, is provided, a chip area of the semiconductor integrated circuit 73 can be reduced.

In the first and second embodiments, N-channel DMOS transistors in an open-drain structure are used as the output transistor MDT1. Instead, a P-channel DMOS transistor in an open-drain structure may be used. In the third and fourth embodiments, an NPN transistor in an open-collector structure is used as the output transistor. Instead, a PNP transistor in an open-collector structure may be used. Moreover, instead of the open-drain or open-collector output transistor, an output transistor in a push-pull structure, which is formed with a high-side output transistor and a low side output transistor, may be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and the spirit of the inventions.

What is claimed is:

1. A semiconductor integrated circuit device, comprising:
   a power source circuit that is connected to a terminal of a first high potential side power source and that outputs a voltage of a second high potential side power source;
   an output transistor that includes a first terminal, a second terminal that is connected to a terminal of a low potential side power source, and a control terminal and that outputs an output signal from the first terminal to an output terminal;
   a first diode that includes a cathode connected to the terminal of the first high potential side power source and an anode connected to the output terminal;
   a connection circuit that is connected between a terminal of the second high potential side power source and the terminal of the low potential side power source, and in which a current source and a capacitor are arranged in a cascade connection; and
   a logic circuit to which a signal obtained from a connection node of the current source and the capacitor and a control signal that controls on/off operations of the output transistor are inputted and which outputs a signal obtained by a logic operation to the control terminal of the output transistor.

2. The semiconductor integrated circuit device of claim 1, wherein
   the logic circuit is an NAND logic circuit.

3. The semiconductor integrated circuit device of claim 2, wherein the NAND logic circuit includes:
   a first P-channel transistor that includes a gate connected to the connection node and a source connected to the terminal of the second high potential side power source;
   a first N-channel transistor that includes a gate connected to the connection node and a source connected to the terminal of the low potential side power source;
   a second P-channel transistor that includes to a gate to which the control signal is inputted, a source connected to the terminal of the second high potential side power source, and a drain connected to a drain of the first P-channel transistor and the control terminal of the output transistor; and
   a second N-channel transistor that includes a gate to which the control signal is inputted, a source connected to a drain of the first N-channel transistor, and a drain connected to a drain of the second P-channel transistor.

4. The semiconductor integrated circuit device of claim 2, wherein
   inverters are connected between the NAND logic circuit and the output transistor.

5. The semiconductor integrated circuit device of claim 2, wherein the NAND logic circuit includes:
   a first NPN transistor that includes a base electrically connected to the connection node and an emitter electrically connected to the terminal of the low potential side power source; and
   a second NPN transistor that includes a base to which the control signal is inputted, an emitter electrically connected to a collector of the first NPN transistor, and a collector electrically connected to the terminal of the second high potential side power source and the control terminal of the output transistor.

6. The semiconductor integrated circuit device of claim 1, wherein
   the output transistor is either an N-channel transistor in an open-drain structure or an NPN transistor in an open-collector structure.

7. The semiconductor integrated circuit device of claim 6, wherein
   the N-channel transistor in the open-drain structure is a DMOS transistor.

8. The semiconductor integrated circuit device of claim 1, wherein
   the current source is configured with a current mirror circuit.

9. The semiconductor integrated circuit device of claim 1, further comprising:
   an internal circuit that outputs the control signal.

10. The semiconductor integrated circuit device of claim 9, wherein
    the internal circuit outputs the control signal that is obtained by a logical operation process performed on an input signal.

11. The semiconductor integrated circuit device of claim 1, wherein
    when a positive ESD voltage is applied to the output terminal, the power source circuit increases a voltage of the second high potential side power source, and the logic circuit outputs a high level signal to the control terminal of the output transistor so as to turn on the output transistor.

12. The semiconductor integrated circuit device of claim 1, wherein
    the logic circuit is configured with inverters and a 2-input NOR circuit.

13. The semiconductor integrated circuit device of claim 6, wherein
    a second diode is incorporated in the N-channel transistor in the open-drain structure,
    a cathode of the second diode is connected to a drain of the N-channel transistor, and
    an anode of the second diode is connected to a source of the N-channel transistor.

14. The semiconductor integrated circuit device of claim 3, wherein
    a capacitance of the capacitor is larger than a gate capacitance of the first P-channel transistor and larger than a gate capacitance of the first N-channel transistor.

15. A semiconductor integrated circuit device, comprising:
    a power source circuit that is configured to receive a voltage of a first high potential side power source and to output a voltage of a second high potential side power source based on the voltage of the first high potential side power source;
    an internal circuit that is configured to output a first control signal based on a received input signal and based on the voltage of the second high potential side power source;

a connection circuit that is configured to output a second control signal based on the voltage of the second high potential side power source;

a logic circuit that receives the first and second control signals, and that performs a logical operation based on the first and second control signals to output a logic signal; and an output circuit that is configured to receive the logic signal from the logic circuit, be turned on when the logic signal indicates the presence of a surge voltage at a device output terminal, and, when turned on, dissipate the surge voltage to a side of the low potential side power source to thereby protect the internal circuit from the surge voltage.

16. The semiconductor integrated circuit device of claim 15, wherein the power source circuit is connected between the first high potential side power source and the low potential side power source, the internal circuit, the connection circuit and the logic circuit are connected between the second high potential side power source and the low potential side power source, and the output circuit is connected between the device output terminal and the low potential side power source.

17. The semiconductor integrated circuit device of claim 16, further comprising:

a protection diode that is connected between the high potential side power source and the device output terminal and that is biased to cause the voltage of the first high potential side power source and the voltage of the second high potential side power source to instantaneously rise when the surge voltage is applied to the device output terminal, and to thereby cause the logic signal to turn on the output circuit.

18. The semiconductor integrated circuit device of claim 15, wherein the connection circuit includes a current source, a capacitor and a node between the current source and the capacitor that connects the connection circuit to the logic circuit, and the connection circuit outputs the second control signal to the logic circuit when the surge voltage is present.

19. The semiconductor integrated circuit device of claim 15, wherein the logic circuit is at least one of a 2-input NAND circuit that includes four MOS transistors and 2-input NAND circuit that includes two NPN transistors and three resistors, and the output circuit is at least one of an open drain type double diffusion MOS transistor that includes an output transistor and a diode and an open collector type NPN transistor.

* * * * *